United States Patent [19]
Meunier

[11] Patent Number: 5,815,213
[45] Date of Patent: Sep. 29, 1998

[54] VIDEO SIGNAL SYNCHRONIZATION EXTRACTION DEVICE

[75] Inventor: Thierry Meunier, Pommiers la Placette, France

[73] Assignee: Thomson multimedia S.A., Courbevoie, France

[21] Appl. No.: 553,616
[22] PCT Filed: Jun. 3, 1994
[86] PCT No.: PCT/FR94/00658
  § 371 Date: Apr. 2, 1996
  § 102(e) Date: Apr. 2, 1996
[87] PCT Pub. No.: WO94/30005
  PCT Pub. Date: Dec. 22, 1994

[30] Foreign Application Priority Data

Jun. 8, 1993 [FR] France ................................ 93 06834

[51] Int. Cl.⁶ ................................................ H04N 5/08
[52] U.S. Cl. .................................... 348/533; 348/525
[58] Field of Search ............................... 348/525, 528, 348/529, 530, 531, 532, 533, 534, 535; 358/153, 155, 156, 157; 327/74, 76, 90, 91, 50; H04N 5/08

[56] References Cited

U.S. PATENT DOCUMENTS 3,706,847  12/1972  Smeulers .......................... 348/532
4,550,342  10/1985  Buchanan et al. .................. 348/531

FOREIGN PATENT DOCUMENTS 60-264167  12/1985  Japan ............................... H04N 5/08
1385326    3/1988   U.S.S.R. ........................... H04N 5/08
1401643    6/1988   U.S.S.R. ........................... H04N 5/08
2189108   10/1987   United Kingdom ............. H04N 5/08

OTHER PUBLICATIONS

Soviet Patent Abstracts, Section EI, Week 8841, 23 Nov.1988, Derwent Publn. Ltd., London & SU Patent 1385326.
Patent Abstracts of Japan, vol. 10, No. 137, 21 May 1986 & Japanese Patent No. 60–264167.

*Primary Examiner*—Chris Grant
*Attorney, Agent, or Firm*—Joseph S. Tripoli; Frederick A. Wein

[57] ABSTRACT

A device for extracting synchronization from a video signal. The device includes a dual-threshold synchronization pulse detection circuit, a first threshold device for detecting the leading edge of a pulse, and a second threshold device for detecting the trailing edge of the same pulse. The thresholds of the devices are defined by a synchronization pulse amplitude detector. The device includes sample-and-hold circuitry for bringing back the voltage stored by the amplitude detector in a storage capacitor to the voltage corresponding to the synchronization pulse, when a synchronization pulse is detected.

10 Claims, 4 Drawing Sheets

VIDEO SIGNAL SYNCHRONIZATION EXTRACTION DEVICE

The present invention relates to a device for extracting synchronization from a composite video signal. In a wider sense, the device in accordance with the invention is used in the video field. The invention is particularly suitable for integration on an integrated circuit.

Figure 1:
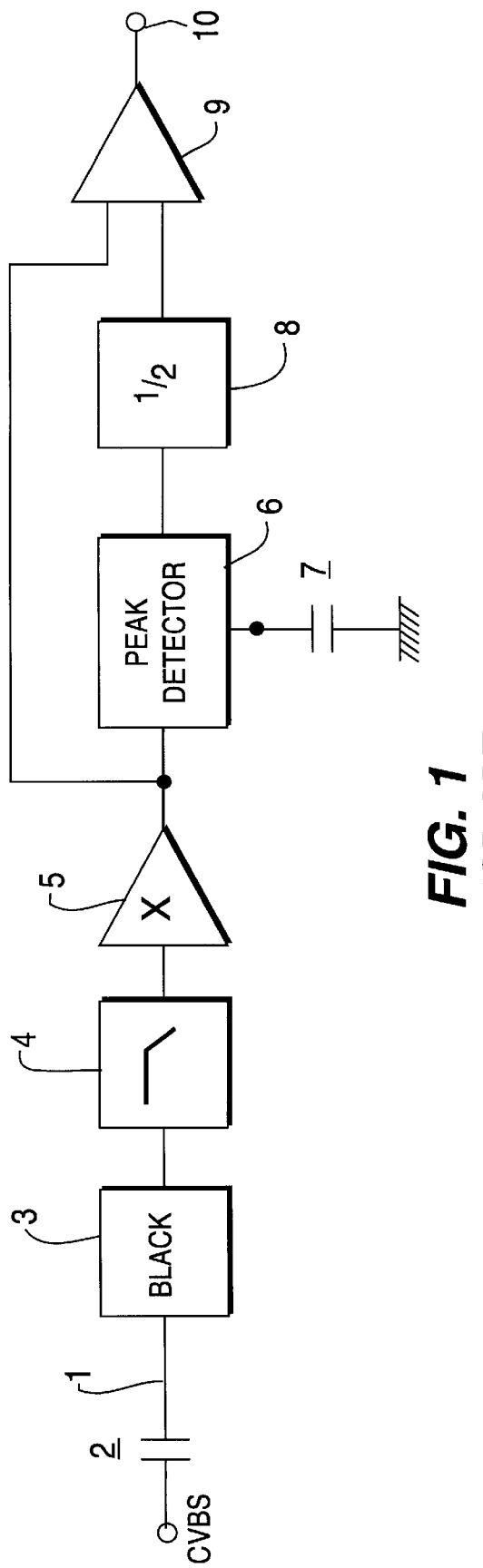

An example of a synchronization extraction device according to the prior art is represented diagrammatically in FIG. 1. This device receives the composite video baseband signal (called CVBS signal) on a connection 1, through an external clamping capacitor 2. According to the present example, the CVBS signal is of positive polarity, which means that the synchronization pulses are formed by square-waves which are, negative with respect to the black level. The device further comprises a black-level recovery unit 3, a low-pass filter 4, an amplifier 5, a peak detector 6, a voltage divide-by-2 circuit (8), these elements being mounted in series. An external capacitor 7 stores the voltage value supplied by the peak detector 6. The outputs of the amplifier 5 and of the divider 8 are connected to the inputs of a comparator 9.

The CVBS input signal is aligned ("clamped") to a black reference voltage internal to the circuit 3 by means of this circuit 3 and or the capacitor 2. This clamping is carried out by means known to the person skilled in the art.

The low-pass filter 4 reduces the synchronization burst, the chrominance subcarrier and the noise component. The peak detector 6 detects the value of the peak voltage of the synchronization pulses previously amplified, and, in the present example, inverted, by the amplifier 5. The resultant value is stored by the external capacitor 7. The threshold for detecting a synchronization pulse is situated at 50% of the sum of the black level and the value held in the capacitor 7. The comparator 9 supplies a logic signal at the point 10 of the device, this signal corresponding to the threshold being crossed or not crossed. This signal is in the high state when a pulse is detected (signal above the threshold) and in the low state in the opposite case.

This circuit exhibits disadvantages under certain working conditions. This is because, in practice, a video signal only rarely has the profile of a theoretical CVBS signal. An example of such a signal is given diagrammatically in FIG. 2. According to this example, in accordance with the CCIR standards, the amplitude of the synchronization pulses 11 is ideally 300 mV. However, in real signals, this value can vary between 20 and 800 mV. The change in this value can occur within the time for a given transmission or more abruptly upon a change from one transmission to another.

If a large-amplitude pulse is followed by pulses the amplitude of which falls off rapidly with respect to this first pulse, these lower-amplitude pulses risk not being taken into account by the extraction device, the capacitor of the peak detector not having time to discharge sufficiently rapidly to follow the weakening of the amplitudes; with the peaks of these weaker pulses being situated below the detection threshold mentioned above, they will be forgotten. The variation in amplitude from one pulse to another generally does not exceed 10%, but this variation can be continued in the same sense over a certain number of pulses. A similar problem exists during the frame return when certain types of clamping circuits (type known as "IXI", where X represents the ratio between the charging and discharging currents of the clamping capacitor) are employed; the peak detector (or bottom detector if the signal is not inverted by the amplifier) cannot always follow the rapidity with which the clamping is performed. In both cases, a problem is encountered in sizing the storage capacitor of the peak detector; a compromise has to be found between the rapidity of the device and its sensitivity to low currents, The amplitude variation can be introduced by an automatic gain control (AGC) device. This problem is particularly acute when the signal is of the SECAM L type, in which the video signal is positive-amplitude modulated on a carrier. AGC will have the effect of causing the amplitude of pulses to vary as a function of the content of the image.

Figure 3A:
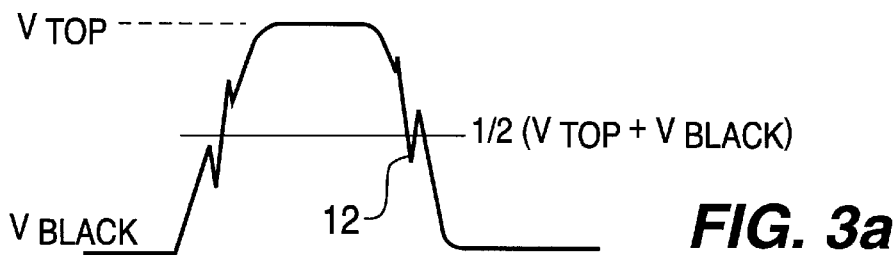

Another problem appears when the signal is noisy or includes echoes. Such defects are only partially corrected by the low-pass filter 4. An example of a noisy synchronization pulse is represented in FIG. 3a. The black reference level is designated by Vblack, and the value stored by the bottom detector is designated by Vtop. The detection threshold giving rise to a square-wave pulse at the output of the device is ½ (Vtop+Vblack). The signal represented includes a defect 12 which makes it pass back below the threshold value before the trailing edge of the pulse. This is conveyed by the appearance, in the output logic signal represented in FIG. 3b, by a spurious pulse 13. The circuits using the said logic signal may thus be disturbed.

The object of the invention is to propose an extraction device making it possible consequently to reduce the above-mentioned drawbacks.

The subject of the present invention is a device for extracting synchronization from a video signal including dual-threshold synchronization pulse detection means, characterized in that the said detection thresholds are proportional to the amplitude of the synchronization pulses.

According to one particular embodiment of the invention, the amplitude of the synchronization pulses is represented by a voltage stored by an amplitude detector in a storage capacitor.

According to a particular embodiment, the said dual-threshold detection means comprise a comparator, one input of which receives a signal representing the synchronization pulses, the other input receiving the comparison threshold, the dual-threshold detection means comprising means for deriving two comparison thresholds, each of these thresholds being associated with one state of the said comparator.

According to one particular embodiment, the difference in absolute value between the reference level (here the black reference level) and the threshold intended for the leading edge of the synchronization pulse (first threshold) is greater than between the reference level and the threshold intended for the trailing edge (second threshold). It will be said in what follows that the first threshold is higher than the second; this means height, in absolute value, with respect to the reference value, which may, for example, be the black reference level. In this way, the amplitude of a spurious signal or of an echo must be all the greater to trigger the comparator when a leading edge is awaited. Likewise, when a detected pulse is present (the comparator being in the appropriate state), the amplitude of a spurious signal must be all the greater to make the comparator latch back over to the state corresponding to no pulse being detected. Noise immunity and immunity to certain echoes is thus greatly enhanced. The thresholds may, quite clearly, be different from the examples given in this description.

According to one particular embodiment, the means of deriving the two comparison thresholds comprise a first and a second resistor, connected in series between, on the one hand, a voltage source corresponding to the stored voltage and, on the other hand, the reference voltage, the midpoint of these two resistors supplying the desired threshold voltages, being connected to a switch in series with a current source duplicating the current flowing in the second resistor situated between the midpoint and the reference voltage, the said switch being controlled so as to conduct when a pulse is detected and not to conduct when no pulse is detected.

According to one particular embodiment, the device comprises, in series, a clamping capacitor, a low-pass filter and an inverting amplifier, the input signal being clamped by a clamping circuit so that the black level of the signal after amplification is at the reference level, the signal at the output of the amplifier being the signal representing the synchronization pulses.

According to one particular embodiment, the said amplitude detector includes sample-and-hold means for bringing back the voltage stored in the storage capacitor to the voltage corresponding to the synchronization pulse, when a synchronization pulse is detected.

The sample-and-hold means allow rapid matching of the voltage stored in the storage capacitor to a possible lowering of the amplitudes of the pulses. According to one embodiment, the current created by the sample-and-hold means is such that it makes it possible to cause the stored voltage to vary sufficiently rapidly for matching to be possible between stored voltage and voltage corresponding to the pulse, over the duration of the said pulse. In this way, detection by double threshold becomes much more precise.

According to one particular embodiment, the said sample-and-hold means create a current counter to the current which the amplitude detector creates in order to modify the voltage of the storage capacitor.

According to one particular embodiment, the current created by the amplitude detector is of greater strength in absolute value than the current created by the sample-and-hold means.

According to one particular embodiment, the sample-and-hold means do not pass current when the amplitude detector is passing current.

According to one particular embodiment, the current created by the sample-and-hold means is a function of the difference between the voltage stored by the storage capacitor and the reference voltage.

According to one particular embodiment, the said current is proportional to the said voltage difference.

It is quite obvious that the processing of a non-inverted signal falls within the context of the invention. It is within the competence of the person skilled in the art to achieve this adaptation from the present description.

Figure 2:
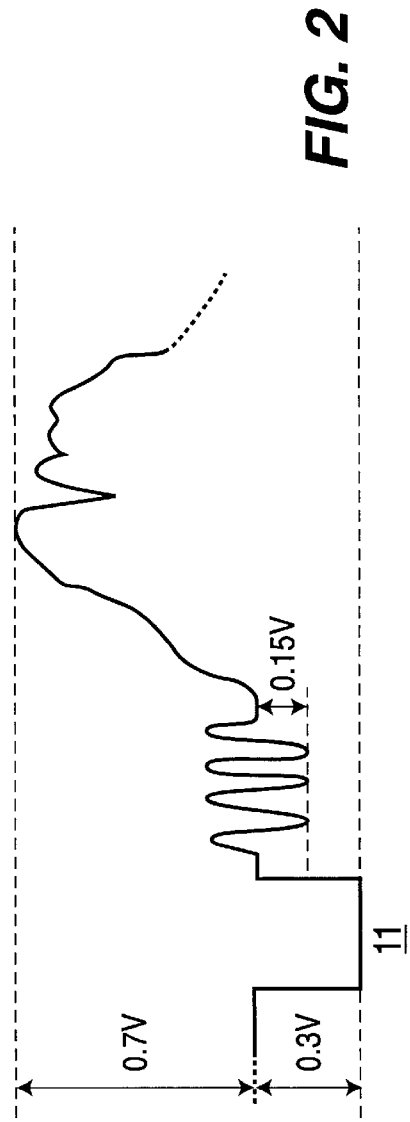
Figure 3B:
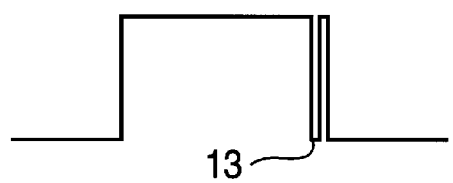
Figure 4:
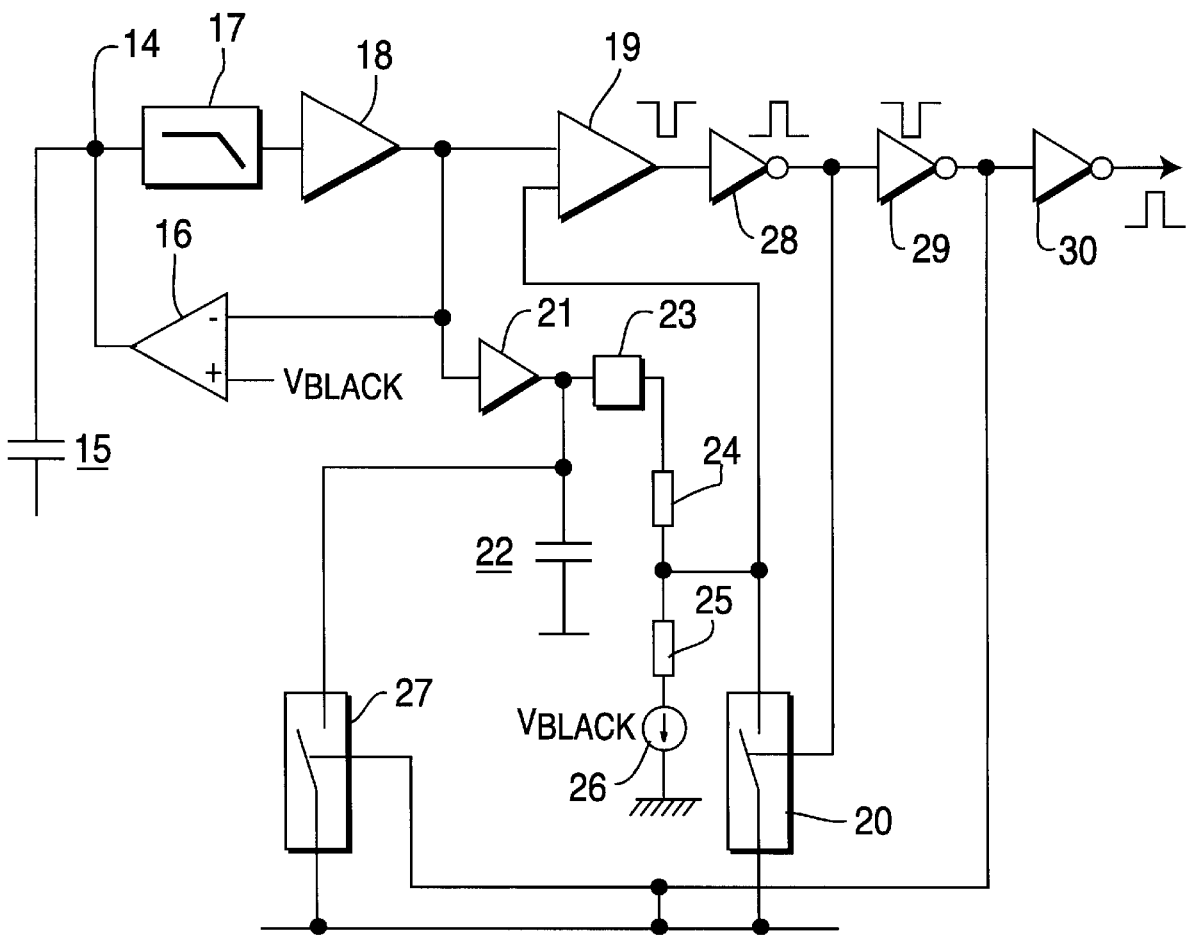
Figure 5:
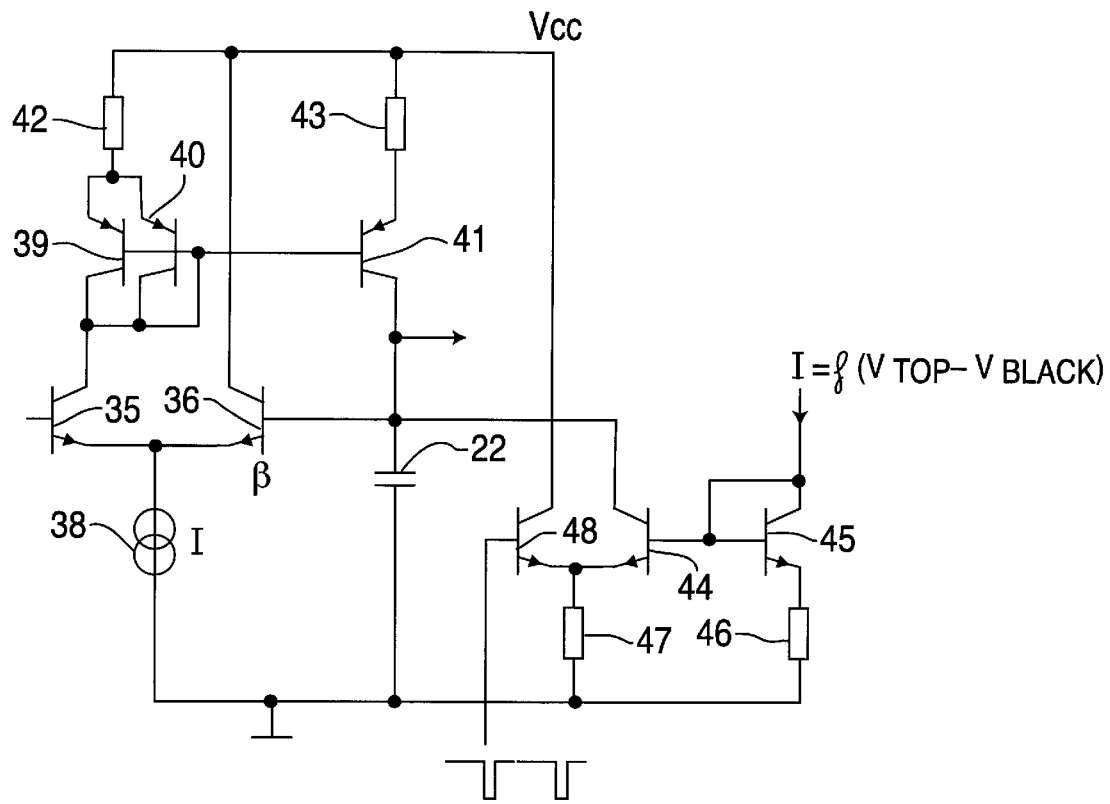
Figure 6:
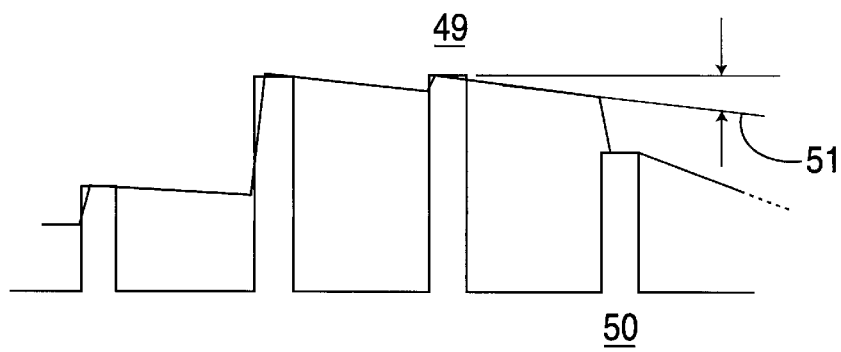
Figure 7:
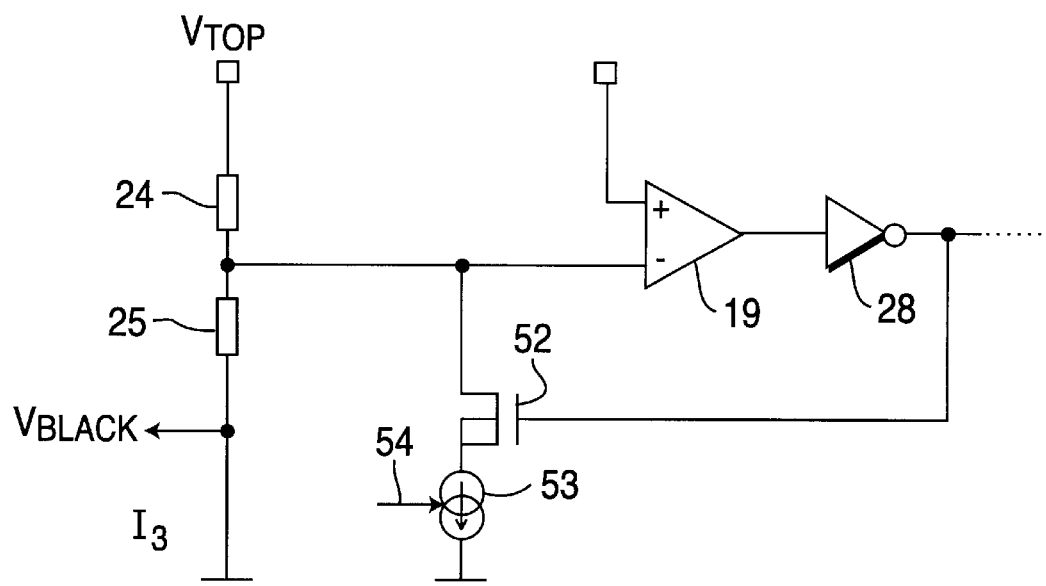
Figure 8:
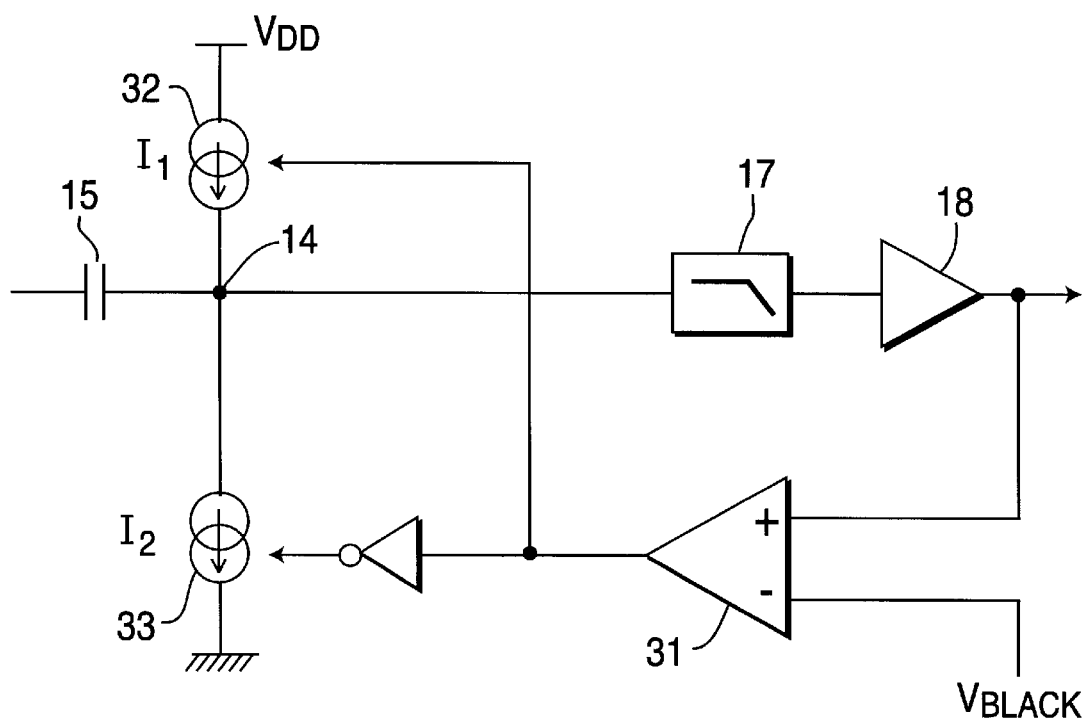

Other characteristics and advantages of the device in accordance with the invention will emerge through the detailed description of a non-limiting embodiment represented in the attached figures, among which:

FIG. 1, already described, represents a block diagram of a known synchronization extractor, FIG. 2, already described, diagrammatically represents a signal to the CCIR standards, FIG. 3a, already described, diagrammatically represents a noisy synchronization pulse, FIG. 3b, already described, represents an output logic signal of the comparator of the extraction device of known type receiving the pulse of FIG. 3b, FIG. 4 represents a theoretical diagram of a synchronization extraction device in accordance with the invention, FIG. 5 represents a specific example of an embodiment of the peak detector and a specific example of the sample-and-hold circuit which are used in the device in accordance with the invention, FIG. 6 diagrammatically illustrates the change in the voltage of the storage capacitor if the sample-and-hold circuit is used when a synchronization pulse is followed by another pulse of weaker amplitude, FIG. 7 represents the electrical diagram of a particular embodiment of the hysteresis circuit in accordance with the invention, FIG. 8 a represents a particular embodiment of the clamping circuit used.

A device in accordance with the invention, and represented in the form of a block diagram in FIG. 4, includes a connection terminal 14, receiving the composite video signal including the pulses to be extracted, through a clamping capacitor 15. The device includes a low-pass filter 17 receiving the clamped signal as input, the filter 17 being followed by an inverting amplifier 18. The output of the amplifier 18 is connected, on the one hand, to the negative input of a comparator 19, the positive input of this same comparator receiving an appropriate threshold voltage derived by a hysteresis circuit 20, on the other hand to one input of a clamping circuit 16. The clamping circuit 16 clamps the input signal so that, after amplification, the black level is at the black reference level Vblack. The output of the inverting amplifier 18 also feeds a peak detector circuit, storing the detected voltage in a storage capacitor 22, connected to earth. From the voltage (Vtop) thus stored, a matching circuit 23 creates a corresponding voltage source, which feeds a resistor 24. A resistor 25 is connected, on the one hand, in series with this resistor 24, and on the other hand by its other end to a voltage source 26 of value Vblack and to a current mirror, not represented, which duplicates the current flowing in the resistor 25 for the hysteresis circuit 20. The midpoint of the resistors 24 and 25 is connected, on the one hand, to the positive input of the output comparator 19, and on the other hand to the output of the hysteresis circuit 20, which will be described in more detail later.

The terminal of the storage capacitor 22 fed by the peak detector 21 is also connected to the sample-and-hold circuit 27.

The output of the comparator 19 supplies a logic signal which is in the low state in the presence of a synchronization pulse (output signal from the amplifier 18 higher than the threshold supplied by the circuit with hysteresis 20), and which is in the high state in the opposite case. According to the present embodiment, three inverting and impedance matching buffers 28, 29, 30 are provided in series at the output of the comparator 19.

After the first buffer 28, a signal in the high state is available when a pulse is detected. This signal controls the hysteresis circuit 20.

After the second buffer 29, a signal identical to the one present at the output of the comparator 19 is available. This signal controls the sample-and-hold circuit 27.

After the third buffer 30, a signal identical to the signal present after the first buffer is still available. This is the output signal of the extractor device in accordance with the invention.

The low-pass filter 17 serves to attenuate the chrominance subcarrier as well as the noise component of the clamped video signal. According to one particular embodiment matched to the PAL standard, it possesses a passband of 1.5 MHz a −3 dB and an attenuation of −13 dB at the cutoff frequency fc of 4.43 MHz.

The amplifier 18 makes it possible to increase the dynamic range of the pulses to be detected. According to one particular embodiment, this is an inverting amplifier of conventional type, with gain A=−15. The inversion will have the consequence of the use of a peak detector to determine the amplitude of the synchronization pulses.

The clamp circuit 16, in collaboration with the clamping capacitor 15, means that the black level of the input signal is at the black reference level (Vblack) of the device after amplification. According to one particular example, clamping is effected by charging or discharging the clamping capacitor 15 by an appropriate current.

FIG. 6 shows a simplified example of such a clamping circuit; point 14 is connected to two current sources 32 and 33, with respective currents I1 and I2. The source of I1 is, moreover, connected to the power supply voltage, while the source of I2 is connected to earth. The two sources are controlled respectively by the output signal and the inverse of the output signal of an amplifier 31 mounted as a comparator and receiving the clamping voltage (black reference level of the device) on its negative input, and the filtered, amplified and inverted video signal on its positive input. The other elements of the circuit are arranged as before (clamping capacitor 15, low-pass filter 17 and amplifier 18).

Each time the signal coming from the amplifier 18 is smaller than Vblack, the source of I2 is actuated, which will have the consequence of lowering the voltage of point 14. Each time this signal is larger than Vblack, the source of I1 is activated.

The ratio between the currents I1 and I2 depends on the appearance of the signal to be clamped. For a CVBS signal to the CCIR standard, the ratio will be chosen preferably to be equal to I1/I2=8.

The filtered, amplified and inverted video signal also feeds a peak detector 21, an exemplary embodiment of which is given in the form of an electrical diagram in FIG. 5. According to this particular example, the peak detector comprises two NPN transistors 35, 36, the emitters of which are both connected to the same source of current I 38, the latter also being connected to earth.

The base of the transistor 35 serves as an input for the peak detector. The base of the transistor 36 is connected to the storage capacitor 22.

The collector of the transistor 36 is connected to the power supply voltage of the device.

The detection circuit moreover includes three PNP transistors 39, 40, 41 forming a current mirror; the collectors of the transistors 39 and 40 are connected to the collector of the NPN transistor 35. The emitters to the transistors 39 and 40 are connected to a load resistor 42 which is itself connected to the power supply voltage, while their collectors are connected to their bases. These bases are connected to the base of the transistor 41, the collector of which is connected to the storage capacitor 22. Finally, the emitter of the transistor 41 is connected to a load resistor 43, which is also connected to the power supply voltage.

When the voltage present on the base of the NPN transistor 35 (input connection of the peak detector) is higher than the voltage stored by the capacitor 22, transistor 35 conducts, while transistor 36 is turned off. The current I then passes essentially in the transistor 35, the transistors 39 and 40 and the load 42. By means of the current mirror (39, 40, 41), the same current I then charges the capacitor 22.

When the voltage present on the base of the NPN 35 is below the stored voltage, transistor 36 conducts, while transistor 35 is turned off. The capacitor is then slowly discharged, essentially via the base of the transistor 36, by a current which is a function of the β parameter of the NPN transistors.

The capacitor 22 is thus charged to a voltage corresponding to the peak voltage sought.

So that the stored voltage can be used by the other circuits of the extraction device without that causing a variation in the said voltage, a matching stage 23 is provided, which, from the stored voltage creates a voltage source of the same value. The production of such a stage is conventional and will not be described in further detail.

The extraction device in accordance with the invention also includes a sample-and-hold circuit 27, which discharges the capacitor 22. A particular embodiment is also represented in FIG. 5. This circuit includes a first NPN transistor 45, the base of which is connected to the collector, which is itself connected to a current source, not represented. According to one particular embodiment, this current is a function of the difference (Vtop-Vblack). According to one particular embodiment, this current is proportional to (vtop-Vblack). The production of such a current source is obvious to the person skilled in the art. The emitter of transistor 45 is linked to a load resistor 46 the other terminal of which is earthed.

The base of the transistor 45 is also connected to the base of a second NPN transistor 44, the collector of which is connected to the capacitor 22 (obviously, to the terminal of the capacitor which is not earthed), and the emitter of which is connected, on the one hand, to a load resistor 47 and to the emitter of a third NPN transistor 48.

The collector of the transistor 48 is connected to the power supply voltage, while the base is actuated by the inverted logic signal output by the second inverting buffer 29. Hence, transistor 48 conducts when no pulse is detected.

In this latter instance, the emitter-base voltage of the collector of transistor 44 is such that the transistor is turned off; there is no current for discharging the capacitor 22.

When a pulse is detected, transistor 48 is turned off. Transistors 44 and 45 then operate as a current mirror and a discharge current proportional to (Vtop-Vblack) is drawn from the capacitor 22.

The change in the stored voltage Vtop is illustrated in a simplified way in FIG. 6. A synchronization pulse 49 is followed by a pulse 50, of lower amplitude. It is detected when its amplitude is higher than the first detection threshold (corresponding to the leading edge of the pulse 50). The discharge current, which up to now was low, then becomes much greater and proportional to (Vtop-Vblack). This is expressed as a change in the voltage drop which, just before the pulse, was a linear drop with a slight slope 51, dependent on β. The capacitor 22 then discharges rapidly until reaching the synchronization pulse voltage. From this moment, the peak detector again comes into action and recharges the capacitor 22 in the way described above. The charging current of the peak detector is such that it is always greater than the discharging current of the sample-and-hold circuit 27, so that the voltage stored in the capacitor 22 does not fall significantly below the voltage corresponding to the amplitude of the pulse 50.

According to one variant embodiment, there is no relation of any particular kind between the current for charging the capacitor 22 and the discharge current created by the sample-and-hold circuit. In this case, a circuit element is provided, not represented, which blocks the discharge current of the circuit 27 when the peak detector 21 is charging the capacitor 22. A conflict in the charge and discharge current is thus avoided.

The trailing edge of a synchronization pulse is generally fairly steep (of the order of 100 to 200 ns for a pulse with a duration of 4 to 4.7 µs) so that the capacitor is not significantly discharged when the detection threshold of this trailing edge is chosen to be low.

Once this second detection threshold is reached, transistor 48 of the sample-and-hold circuit 27 again becomes conducting, and the voltage drop regains the slope 51.

The device in accordance with the invention also includes a hysteresis circuit 20. This makes it possible to supply the comparator 19 with two different comparison thresholds according to the state of this comparator.

A particular embodiment of the said circuit 20 is given in the form of an electrical diagram in FIG. 7. In this diagram the comparator 19, the inverting buffer 28 as well as the resistors 24 and 25 are again found. The hysteresis circuit includes a switch 52 controlled by the logic signal output by the buffer 28, so that the said switch conducts only in the presence of a detected synchronization pulse. The switch 52 links the midpoint of the resistors 24 and 25 (and thus the corresponding input of the comparator 19) to a current source 53. The current 13 flowing in this source 53 is the same as that flowing in the resistors 24 and 25, duplicated by a current mirror, not represented but shown symbolically by an arrow 54 in FIG. 7.

When the switch 52 is open (hence when no pulse is detected), the threshold voltage presented at the midpoint of the two resistors is:

$$V_{threshold} = \frac{2}{3}Vtop + \frac{1}{3}Vblack$$

This is in the case of a particular example in which R25=2×R24, in which R24 and R25 represent the values of the resistors 24 and 25 respectively.

This threshold thus corresponds to the threshold for detection of the leading edge of a pulse.

Likewise, when switch 52 is closed:

$$V_{threshold} = \frac{1}{2}Vtop + \frac{1}{2}Vblack$$

This threshold corresponds to the threshold for detection of the trailing edge of a pulse.

The closer the choice of the first threshold to Vtop+Vblack, the greater the amplitude of the possible noise will have to be to make the comparator latch over. Likewise, the closer the choice of the second threshold to Vblack, the greater the noise amplitude will have to be with respect to the stored peak voltage.

The invention applies particularly to extracting synchronization pulses from a SECAM, PAL or NTSC signal, and is particularly suitable when the signals are positively modulated on the carrier for transmission. Finally, depending on the polarity of the pulses to be detected, a bottom detector rather than a peak detector will be used. In this case, the storage capacitor will be connected to the power supply voltage rather than to earth. The sample-and-hold circuit will be modified so that the current which it creates is always counter to the current created by the bottom detector.

I claim:

1. Device for extracting synchronization from a video signal including dual-threshold synchronization pulse detection means wherein the detection thresholds are proportional to the amplitude of the synchronization pulses, the amplitude of the synchronization pulses is represented by a voltage stored by an amplitude detector in a storage capacitor, a sample-and-hold means for bringing back a voltage stored in the storage capacitor to a voltage corresponding to a synchronization pulse, when a synchronization pulse is detected, said sample-and-hold means creating a second current counter to first current which the amplitude detector creates in order to modify the voltage of the capacitor, the current created by the amplitude detector is of greater strength in absolute value than the current created by the sample-and-hold means.

2. Device according to claim 1 wherein said dual-threshold detection means comprises a comparator, one input of which receives a signal representing the synchronization pulses, the other input receiving a comparison threshold, the dual-threshold detection means comprising means for deriving two comparison thresholds, each of these thresholds being associated which one state of the comparator.

3. Device according to claim 1 wherein the amplitude of the synchronization pulses is defined with respect to a reference level, the difference between a first comparison threshold associated with the state of a comparator corresponding to no pulse being detected, and the reference level being greater than the difference between a second comparison threshold associated with the state of the comparator corresponding to the detection of a pulse and the same reference level.

4. Device according to claim 1 wherein said dual-threshold synchronization pulse detection means comprises a first and a second resistor, connected in series between a voltage source corresponding to the stored voltage and a reference voltage, the midpoint of the two resistors supplying the desired threshold voltages coupled to a switch in series with a current source duplicating the current flowing in the second resistor situated between the midpoint and the reference voltage, said switch being controlled so as to conduct when a pulse is detected and not to conduct when no pulse is detected.

5. Device according to claim 3 further comprising, in series, a clamping capacitor, a low-pass filter and an inverting amplifier, an input signal being clamped by a clamping circuit so that black level of the signal after amplification is at a reference level, a signal at the output of the amplifier being the signal representing the synchronization pulses.

6. Device according to claim 1, wherein the sample-and-hold means generate said second current only when said amplitude detection means do not generate said first current.

7. Device according to claim 1 wherein the intensity of said second current is a function of the difference between the stored voltage and a reference voltage.

8. Device according to claim 7 wherein said second current is proportional to the difference.

9. Device according to claim 1 wherein said amplitude detector is a peak detector charging the storage capacitor when the voltage of the storage capacitor is below the voltage of the signal output by an amplifier.

10. Device according to claim 1 wherein the sample-and-hold means comprising a first NPN transistor, the collector and base of which are connected to a current source, the emitter of said first transistor being connected to a first load resistor, the other terminal of said first load resistor being earthed, the base of the first transistor also being connected to the base of a second NPN transistor, the collector of said second NPN transistor being connected to a first terminal of the storage capacitor, the second terminal of said storage capacitor being earthed, the emitter of the second transistor being connected to a second load resistor whose other terminal is earthed, and to the emitter of a third NPN transistor, the collector of the third transistor being connected to a power supply voltage, the base of said third transistor being actuated by an output of said dual-threshold synchronization pulse detection means.

* * * * *